T. G. McLAUGHLIN.
Car Brake.
No. 8,924.　　　　　　　　　　　Patented May 4, 1852.
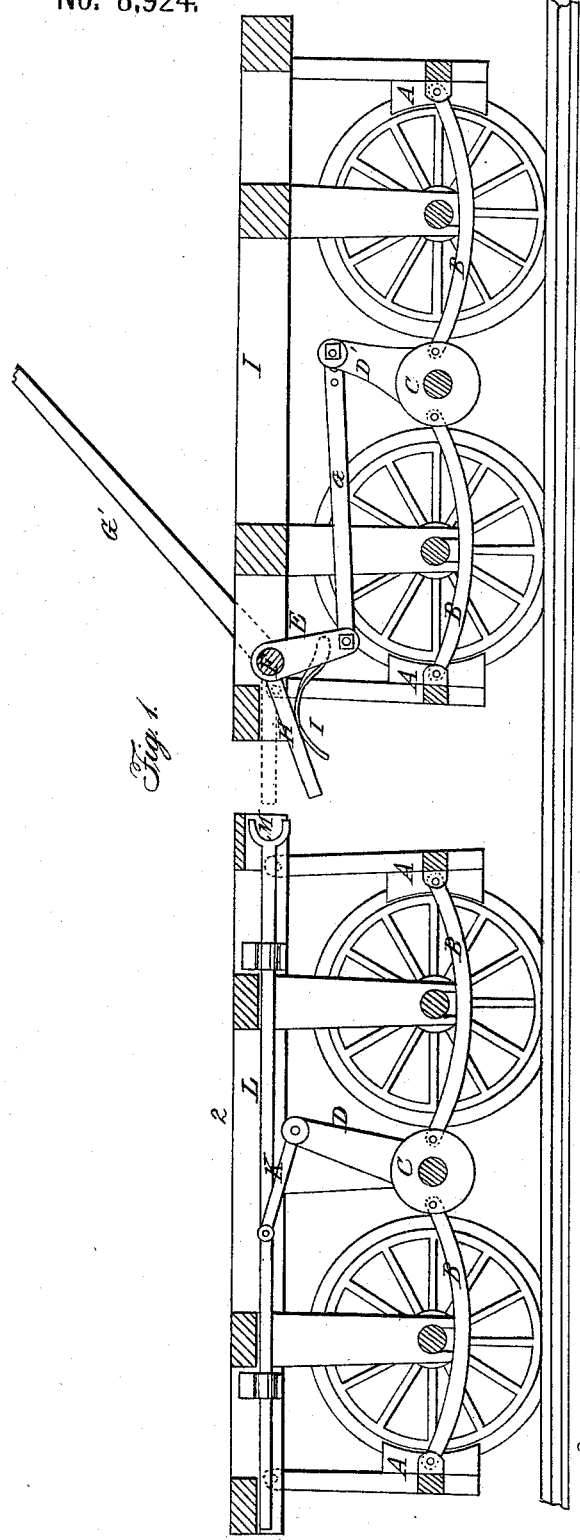
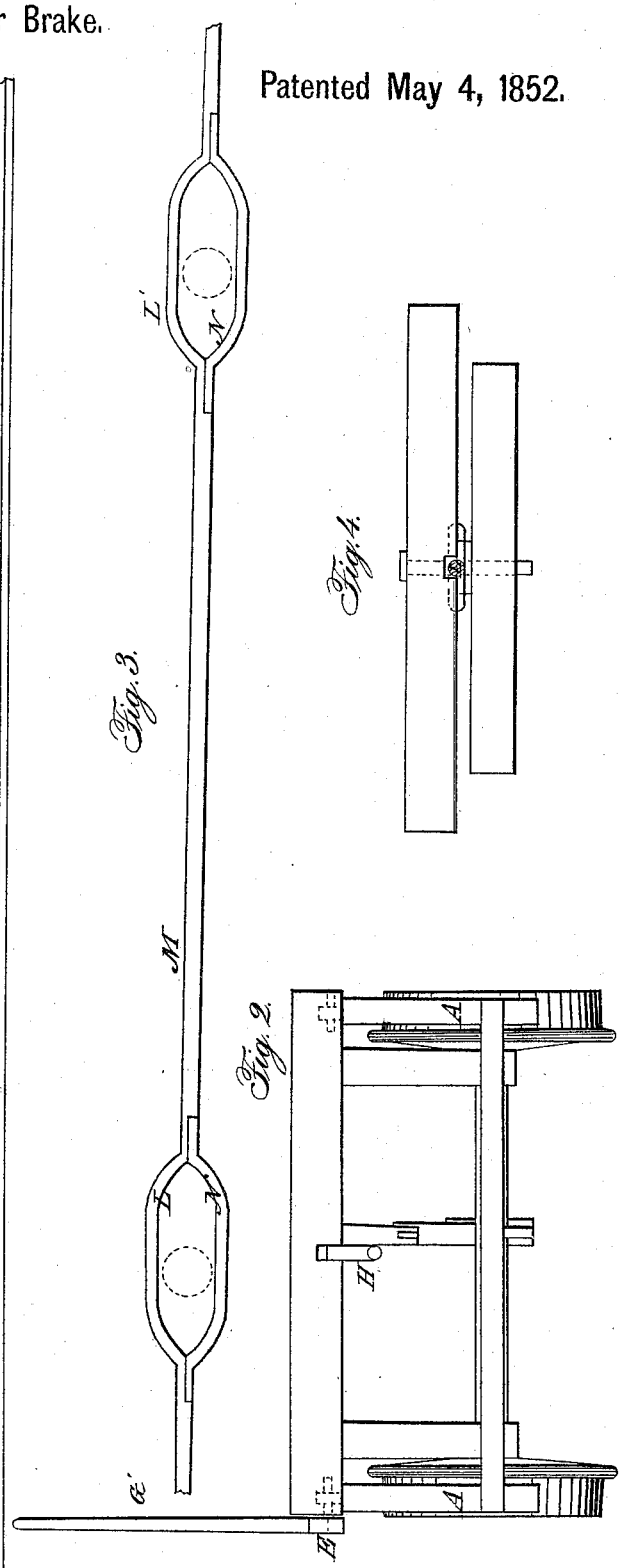

UNITED STATES PATENT OFFICE.

THOMAS G. McLAUGHLIN, OF KENSINGTON, PENNSYLVANIA.

RAILROAD-CAR BRAKE.

Specification of Letters Patent No. 8,924, dated May 4, 1852.

*To all whom it may concern:*

Be it known that I, THOMAS G. MCLAUGHLIN, of Kensington, in the county of Philadelphia and State of Pennsylvania, have invented a new and useful Improvement in the Mode of Operating Railroad-Car Brakes from the Front of the Train, which is described as follows, reference being had to the annexed drawings of the same, making part of this specification.

Figure 1 is a longitudinal section of two four wheeled cars, with the brakes and the parts for operating the same attached. Fig. 2 is a view of the back end of the forward car, on which the brakeman having charge of the train is stationed. Fig. 3 is a top view of the movable bar employed on an eight wheel car. Fig. 4 is a section of the truck of an eight wheel car, showing the relation of the movable bar with the king joint and plates on which the truck traverses, in turning curves.

Similar letters in the figures refer to like parts.

The nature of this invention consists in attaching to the brake lever shaft of the tender of the locomotive, or a car designed to be placed at the head of the train next the tender, a radial bar, turning loosely on said shaft and capable of being raised to a horizontal position without interfering with the operation of the brake on the tender or car on which it is arranged, so as to project beyond the same and to enter, when it approaches, a semispherical cup on the end of a horizontal movable bar or rod, arranged within or beneath the frame of the next car, and connected to its brakes, in such a manner as to enable the brakeman to partially arrest the speed of the front car, on which he is stationed, and cause the whole momentum of the succeeding car to be exerted on the movable bar or rod, and from thence on to its brakes, and so on in like manner employ the momentum of each succeeding car in the train.

To enable others skilled in the art to make and use my invention I will proceed to describe its construction and operation.

The rubbers A are suspended on journals at the sides of the cars, before and behind the wheels, as heretofore, and the two pair on each truck frame are connected by jointed rods B, or chains, to the edges of a circular plate C (a simple vibrating beam may be used if desired) secured on a rock shaft and having a radial arm D extending upward as far as convenience will permit. The upper end of the radial arm D' of the front car, is attached to the lower extremity of another arm E radiating from a horizontal transverse shaft F, turning in suitable boxes secured to the back part of the truck frame, by a rod G and bolts, which rod G is perforated with a series of openings near its extremity, so as to enable the ends of the arms D' and E to be brought nearer to, or farther from each other, as occasion may require. This transverse shaft F, extends to the outside of the frame of the car 1, and has a lever G' secured to its outer end, extending to the front part of the car, which lever G' is held firmly in its place, when depresssed to force the rubbers on the wheels, by the usual, or most approved means. A radial bar H, is attached loosely to this shaft F, midway between the sides of the truck frame, which bar, when the lever G' is raised, rests in an inclined position on a curved spring I, secured to the radial arm E, and of such strength and temper as to support said bar H and enable it to be raised to a horizontal position against the frame, without yielding, and yet to give, when the lever is further depressed to clamp the wheels of the car between the rubbers. The remainder of the cars of the train are provided with rubbers A, jointed rods B, or chains, rock shafts, and radial arms D, similar to those above described, except that the radial arms D, extend up between the timbers of the frame, and are attached at their upper ends by jointed bars K, or chains, to horizontal rods L, or bars, secured in boxes in which they have a longitudinal movement in the center of the frame of the cars, and extending nearly the full length of the frame. These rods or bars L, have a semi-spherical or bell shaped cup M, secured on one of their ends, for receiving the end of the radial bar H, or the blank end of the rod or bar L on the next car, and in case of their application to an eight wheel car are bent out of a true line near their ends as at L' and braced at these parts with additional bars or rods N, similar in form to the part bent, so as to form yokes or loops, and work clear of the king joints and plates upon which the trucks traverse, in turning curves, without impairing the strength of the rods or bars L at these parts.

When it is desired to operate the brakes of the several cars in the train, the brakeman who is always stationed on the car 1, and within hearing distance of the engineer, depresses the lever G, thus raising the radial bar H to a horizontal position, and clamping the wheels of said car, and partially arresting its progress. The next car 2 will then approach nearer the forward car 1, and the end of the radial bar H will press against the semi-spherical cup M on the rod L, attached to this car 2, and will move it back, causing it to move the radial bar D, and clamp the wheels between the rubbers, with a force commensurate with the momentum of the car 2, and its back end to project beyond the frame of the car, to operate on the forward end of the rod or bar of the next car in the train in like manner to the action of the radial bar H on its forward end, thus placing the whole train of cars within the power of one brakeman stationed at the forward part of the train, where he can be in communication with the engineer, and can more readily perceive the dangers that are to be avoided, and enabling him to check the train slightly in its speed, or stop it as quick as safety to the passengers will permit, in proportion as he exerts force on the brakes of the car on which he is stationed.

In descending very steep inclined planes, the locomotive is generally detached from the cars, in which case the checking of the train will be left entirely to the brakeman; but in ordinary cases where the locomotive is attached, the engineer can assist the brakeman by checking and increasing the speed of his engine, as occasion may require.

Instead of employing the radial bar H to operate on the ends of the movable bars L, a horizontal bar, moved longitudinally by rack and pinion or screw, may be used for that purpose, but it is believed that the radial bar is preferable, as it enables the wheels of the car to which it is attached to be clamped to any required degree, without interfering with its action on the movable rods L.

What I claim as my invention and desire to secure by Letters Patent is,

The employment of the radial bar H turning loosely on the brake lever shaft F of the tender or forward car 1, and spring I for enabling the brakeman to operate the brake of the tender or forward car on which he is stationed, without altering the position of the radial bar H after being set, as described.

THOMAS G. McLAUGHLIN.

Witnesses:
H. G. White,
James McDevitt.